(12) United States Patent
Valenzuela

(10) Patent No.: US 6,390,349 B1
(45) Date of Patent: May 21, 2002

(54) DEVICE AND METHOD FOR INDUCING A LONGITUDINAL FORCE INTO A FILAMENT

(75) Inventor: Javier A. Valenzuela, Hanover, NH (US)

(73) Assignee: Mikros Manufacturing, Inc., Lebanon, NH (US)

( * ) Notice: Subject to any disclaimer, the term of this patent is extended or adjusted under 35 U.S.C. 154(b) by 44 days.

(21) Appl. No.: 09/586,502

(22) Filed: Jun. 2, 2000

Related U.S. Application Data
(60) Provisional application No. 60/137,207, filed on Jun. 2, 1999.

(51) Int. Cl.⁷ .............................................. B65H 20/00
(52) U.S. Cl. ..................................................... 226/97.4
(58) Field of Search ....................................... 226/97.4

(56) References Cited

U.S. PATENT DOCUMENTS

| | | | |
|---|---|---|---|
| 2,646,941 A | | 7/1953 | Borges, Jr. |
| 3,319,859 A | | 5/1967 | Miller |
| 3,323,754 A | | 6/1967 | Nixdorf et al. |
| 3,669,328 A | | 6/1972 | Castelli |
| 3,944,166 A | * | 3/1976 | Hermanns ................ 242/147 A |
| 3,999,579 A | * | 12/1976 | Ohkouchi et al. ........... 139/435 |
| 4,172,544 A | * | 10/1979 | Pennings et al. ............. 226/97 |
| 4,322,027 A | * | 3/1982 | Reba ............................ 226/97 |
| 4,637,229 A | * | 1/1987 | Taylor, Jr. ..................... 66/146 |
| 4,652,716 A | * | 3/1987 | Schneider et al. ............ 219/69 |
| 6,078,019 A | * | 6/2000 | Medici et al. ........... 219/69.12 |

* cited by examiner

Primary Examiner—Donald P. Walsh
Assistant Examiner—Joseph C Rodriguez
(74) Attorney, Agent, or Firm—Downs Rachlin Martin PLLC

(57) ABSTRACT

A device (10) and method for inducing a longitudinal force into a filament (14) are disclosed. The device includes an enclosure (16) that defines a chamber (18) having a first orifice (32) and a second orifice (42) located in respective opposing end walls. The filament extends through the first orifice, chamber and second orifice. The area of the first orifice is slightly larger than the transverse cross-sectional area of the filament, and the area of the second orifice is larger than the area of the first orifice. The chamber is filled with a pressurized fluid (12), which flows out of the enclosure through the first and second orifices, creating corresponding drag forces (56, 58) on the filament that are in opposite directions to one another. Due to the cross-sectional area of the second orifice being larger than the cross-sectional area of the first orifice, the drag force created by the fluid flowing out of the second orifice is larger than the drag force created by the fluid flowing out of the first orifice, thereby creating a net drag force (15) in the direction of flow through the second orifice. The net drag force induces a longitudinal force into the filament.

49 Claims, 4 Drawing Sheets

DEVICE AND METHOD FOR INDUCING A LONGITUDINAL FORCE INTO A FILAMENT

RELATED APPLICATION

This application claims priority from U.S. Provisional Application Ser. No. 60/137,207, filed Jun. 2, 1999.

FIELD OF THE INVENTION

The present invention relates to the general field of systems for inducing controlled force into a filament. More particularly, the present invention is directed to a force-inducing device utilizing a pressurized fluid to impart a drag force on a filament, thereby inducing a longitudinal force into the filament.

BACKGROUND OF THE INVENTION

Electric discharge machining (EDM) involves the use of a high-frequency electrical spark discharged from a metal tool serving as an electrode to disintegrate regions of a workpiece made of an electrically conductive material, such as hardened steel or carbide. The electrode and workpiece are immersed in a dielectric fluid, and a feed mechanism maintains a spark gap, typically from 0.013 mm to 0.5 mm, between the electrode and workpiece. As the spark discharges, it melts and vaporizes small particles of the workpiece. The particles are flushed away and the electrode is advanced to a new location where another spark is discharged. EDM is accurate and may be used for machining dies, molds, holes, slots or cavities of almost any desired shape. In traveling wire EDM, a small diameter wire is used as the tool for cutting out two- and three-dimensional fretwork profiles.

Present traveling-wire EDM systems use pinch roller and mechanical or electrical clutches to advance the wire and control the tension in the wire. This approach is acceptable for wire having a diameter of greater than 100 microns, but is not suited for wire of smaller diameter. Small diameter wire quickly wears grooves into the pinch rollers, causing the wire to slip and requiring frequent replacement of the rollers. In addition, the relatively low levels of tension, typically on the order of grams and fractions of a gram, required when using small diameter wire are difficult to control with present clutch systems. It is also difficult to rapidly stop and start the advancement of the wire due to the relatively large inertial mass of the pinch roller systems. Moreover, stress concentrations within the wire caused by localized contact between the wire and the rollers causes frequent rupturing of the wire and, therefore, undesirable system downtime while the ruptured wire is replaced and/or re-threaded.

For the foregoing reasons, commercial traveling-wire EDM systems are practically limited to wire having diameters greater than 100 microns. However, it is desirable to use smaller diameter wires in EDM systems to reduce the minimum feature size to which a workpiece may be machined. A smaller diameter wire would concentrate the electrical discharge into a smaller region and, thus, allow for more precise disintegration of the material removed from the workpiece. In addition, it is necessary to maintain the wire at as large a tension as possible to increase the precision of the EDM system. The electrical discharge between the and the workpiece induces vibration into the wire that tends to increase the width of the kerf cut by the wire. However, the more taught the wire, the smaller the amplitude of the vibration and the higher the precision of the cut. Present pinch roller and clutch systems can not provide the level of tension desired for wires less than 100 microns due to the problems associated with such systems noted above.

SUMMARY OF THE INVENTION

The present invention is directed to a device for inducing a force into a filament. The device includes an enclosure that defines a chamber and comprises a first orifice, a second orifice, a sidewall and a fluid inlet. The first orifice, second orifice and fluid inlet are each in fluid communication with the chamber. The first orifice has an area, and the second orifice defines a passageway having a transverse cross-sectional area larger than the area of the first orifice. Each of the first and second orifices are for receiving the filament. The sidewall has an inner surface located radially outward from a line extending between the first and second orifices. The fluid inlet is located non-tangentially to the inner surface of the sidewall.

In another aspect, the present invention is directed to a system for applying a force to a filament. The system comprises at least two devices, each device for applying an incremental force to the filament. Each device includes an enclosure that defines a chamber for receiving the filament. The enclosure includes a first orifice in fluid communication with the chamber and having a longitudinal axis and a cross-sectional area transverse to said longitudinal axis, the first orifice for receiving the filament. The enclosure also includes a second orifice in fluid communication with the chamber and defining a passageway having a diameter, a length, and a cross-sectional area transverse to the length larger than the cross-sectional area of the first orifice, the second orifice for receiving the filament. The enclosure further includes a fluid inlet in fluid communication with the chamber, the fluid inlet for supplying fluid to said chamber. The devices are located in series with one another such that the incremental forces applied to the filament by said at least two devices are applied in the same direction as one another.

In yet another aspect, the invention is directed to a device for applying a force to a filament. The device includes an enclosure and an elongate body. The enclosure defines a chamber for receiving the filament and comprises a first orifice, a second orifice and a fluid inlet, each of which is in fluid communication with the chamber. The first orifice has an area, and the second orifice defines a passageway having a transverse cross-sectional area larger than the area of the first orifice. Each of the first and second orifices are for receiving the filament. The fluid inlet is for supplying fluid to the chamber. The elongate body is located outside the chamber and the passageway extends within the elongate body.

The present invention is also directed to a method of inducing a longitudinal force into a filament. First, an enclosure is provided. The enclosure defines a chamber and has a first orifice and a second orifice each in fluid communication with the chamber. The first orifice has an area, and the second orifice has an area greater that the area of the first orifice. Next, a filament is threaded through the first orifice, chamber and second orifice. A fluid is flowed into the chamber such that the fluid is under pressure relative to an ambient pressure surrounding the enclosure and the filament is substantially linear between the first and second orifices.

BRIEF DESCRIPTION OF THE DRAWINGS

For the purposes of illustrating the invention, the drawings show a form in which the invention may be embodied. It should be understood, however, that the invention is not limited to the precise arrangements and instrumentalities shown.

DETAILED DESCRIPTION OF THE INVENTION

Figure 1:
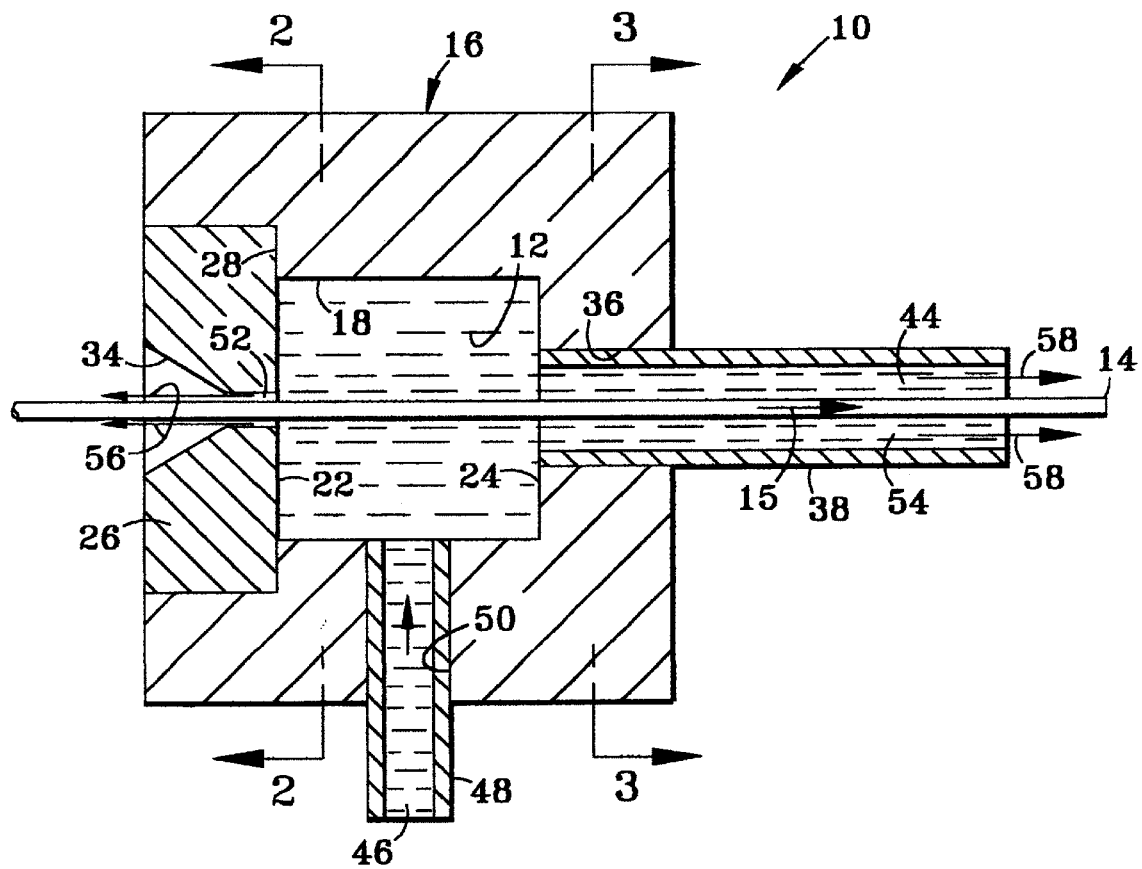
FIG. 1 is an elevational cross-sectional view of a force-inducing device according to the present invention.

Referring to the drawings, wherein like elements are indicated by like numerals, FIG. 1 shows a force-inducing device, which is denoted generally by the numeral 10. Force-inducing device 10 utilizes a pressurized fluid 12 to induce a longitudinal force into a filament 14 without physical contact between device 10 and the filament that may damage the filament. The longitudinal force induced into filament 14 may be precisely controlled by adjusting the pressure of fluid 12 within device 10 accordingly.

Device 10 may be used for a number of applications including inducing tension into filament 14 when the filament is fixed, advancing the filament in the direction of net drag force 15 and providing a braking force to filament 14 when the filament is moving in the direction opposite that of net drag force 15. For example, device 10 may be used in EDM systems, wire-straightening or drawing machines, weaving equipment and the like.

As used herein and in the claims appended hereto, the term "filament" includes wire, yarn, mono-fiber or the like, which may have any cross-sectional shape desired. Device 10 is particularly suited for inducing tension into a small diameter filament, i.e., a filament having a diameter less than 100 microns. However, device 10 may be adapted for filaments of any diameter.

Figure 2:
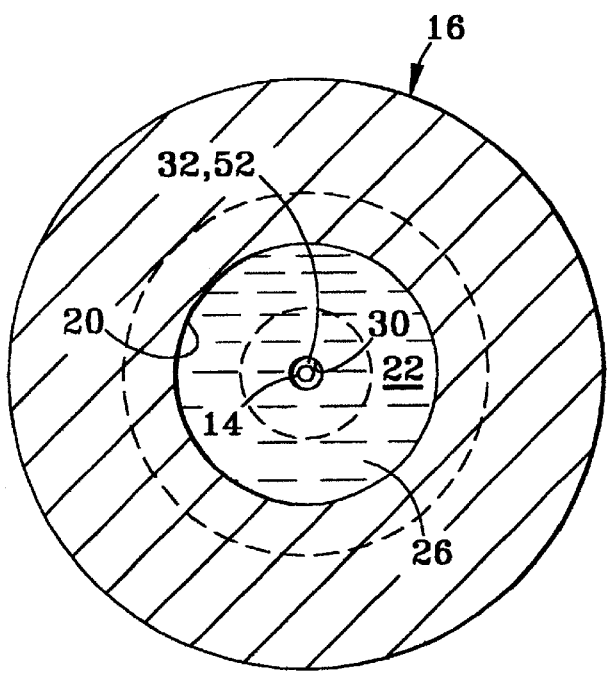
FIG. 2 is a cross-sectional view of the force-inducing device as taken along line 2—2 of FIG. 1.
Figure 3:
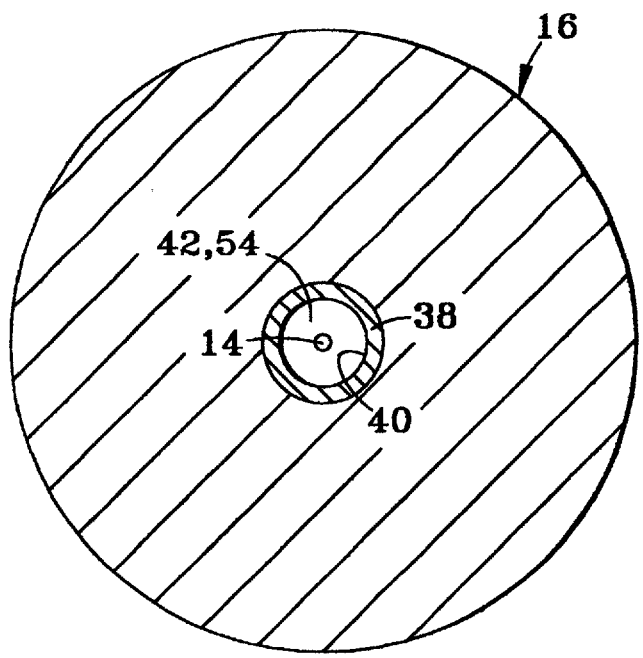
FIG. 3 is a cross-sectional view of the force-inducing device as taken along line 3—3 of FIG. 1.

Referring now to FIGS. 1–3, device 10 comprises an enclosure 16 that defines a chamber 18 and includes a cylindrical sidewall 20, a first end wall 22 and a second end wall 24. Sidewall 20 is preferably made of a metal, for example, stainless steel. However, other materials, such as other types of metal, high-strength polymers, fiber-reinforced plastics or the like, which are capable of withstanding the relatively high pressures within chamber 18, may be used. Although sidewall 20 is preferably cylindrical, other shapes such as polygonal, oval or the like may be used. Accordingly, the cross-sectional shape of chamber 18 in a plane transverse to the longitudinal axis may be any shape desired.

First end wall 22 is formed separately from sidewall 20 and comprises a circular disk 26 that engages a corresponding rabbet 28 formed in sidewall 20. In a preferred embodiment particularly suited for very small diameter filaments, e.g., filaments less than 100 microns in diameter, first end wall is made of a very hard material, such as diamond, that can withstand high operating pressures and any abrasion that may occur during operation. First end wall 22 is preferably attached to sidewall 20 by interference fit. However, depending on the size of device 10, other means, such as adhesive bonding, welding, mechanical fasteners, mating threads on the outer periphery of circular disk 26 and the corresponding surface of rabbet 28 or the like, may be used. Depending on the method of attaching first end wall 22 to sidewall 20 selected, a compression or other type of gasket (not shown) may be used to create a hermetic seal between first end wall 22 and sidewall 20. Although first end wall 22 is shown as being formed separately from sidewall 20, it may be formed integrally with sidewall 20.

First end wall 22 includes an inner periphery 30 that defines a first orifice 32 located concentric with sidewall 20. First orifice 32 preferably has a shape the same as the transverse cross-sectional shape of filament 14, which is circular in the exemplary embodiment. However, the shape of first orifice 32 may be different from the transverse cross-sectional shape of filament 14. First orifice 32 has an area slightly larger than the traverse crosssectional area of filament 14. Preferably, the difference in these areas is the smallest practical that allows at least some of fluid 12 to flow between inner periphery 30 and filament 14 around the entire periphery of filament 14. In this manner, filament 14 does not physically contact first end wall 22 at inner periphery 30, thereby avoiding damage to filament 14 and/or sidewall 20 at inner periphery 30. Preferably, the area of first orifice 32 is on the order of 25% larger than the transverse cross-sectional area of filament 14. Thus, for a filament 14 having a diameter of 25 microns, the preferred diameter of first orifice 32 would be approximately 27.4 microns. First end wall 22 further includes a bevel 34 adjacent first orifice 32 that aids in threading filament 14 through device 10. Although the surface of bevel 34 is shown as being frusto-conical, it may be arcuate so as to form a convex or concave shape.

Second end wall 24 is formed integrally with sidewall 20. However, it may be formed separately from sidewall 20 and attached thereto in a manner similar to first end wall 22. Second end wall 24 has an opening 36 into which is engaged an elongate tube 38. Tube 38 is preferably made of glass and may be attached to end wall by adhesive bonding or the like. Although tube 38 is preferably made of glass, other materials such as metal, plastic or the like, may be used. In alternative embodiments, tube 38 may be formed integrally with second end wall 24, butted against the outer surface of second end wall 24 or the like. Tube 38 has an inner periphery 40 that defines a second orifice 42 and an elongate passageway 44, each located concentrically to sidewall 20.

Second orifice 42 has an area larger that the area of first orifice 32. As more fully described below, the area of second orifice 42 is selected based upon the amount of tension that device 10 is desired to induce into filament 14. All other variables being constant, the larger the area of second orifice 42, the greater the tension induced into filament 14. In a preferred embodiment, the area of second orifice 42 is at least four times greater than the area of first orifice 32. Also as described below, the length of passageway 44 is selected based on the desired flow rate of fluid 12 through second orifice 42 and may be any length desired to suit a particular design. All other variables being constant, the longer the length of passageway 44, the lower the flow rate due to the higher frictional losses caused by the longer length. For a filament 14 having a diameter on the order of 100 microns or less, the length of passageway 44 should be at least fifty times the diameter of second orifice 42. Preferably for such a filament 14, the length of passageway 44 should be several hundred times the diameter of second orifice 42.

Force-inducing device 10 further includes a fluid inlet 46 located in sidewall 20 for connecting device 10 to a source (not shown) for pressurized fluid 12. Fluid inlet 46 is formed by a fitting 48 inserted into an opening 50 in sidewall 20. Fluid inlet 46 is located radial to the longitudinal axis of device 10, although it need not be located radially. Preferably, however, fluid inlet 46 should be located non-tangentially to the inner surface of sidewall 20 to reduce the likelihood of inducing oscillatory motion into filament 14. Fitting 48 may be made of metal and attached to sidewall 20 by welding, adhesive bonding, mating threads or the like. Fitting 48 may include internal or external threads, a knurled outer surface, an external flange or the like, as required to make a fluid tight connection with a conduit (not shown), which carries pressurized fluid 12 from the fluid source to device 10.

In operation, filament 14 extends through first orifice 32 and second orifice 42. Fluid 12 is forced into chamber 18 through inlet 46 under a positive pressure relative to the ambient pressure surrounding device 10. Due to the difference between the pressure of fluid 12 and the ambient pressure, fluid 12 flows out of chamber 18 via first and second orifices 32, 42, respectively, through a first annular passageway 52 between inner periphery 30 and filament 14 and a second annular passageway 54 between inner periphery 40 and filament 14. The fluid velocity in each passageway 52, 54 is such that the frictional drag force between fluid 12 and inner peripheries 30, 40 added to the frictional drag force between the fluid 12 and filament 14 balances the difference of the internal and ambient pressures multiplied by the flow area of the corresponding annular passageway 52, 54. The total drag force in each passageway 52, 54 is proportional to the product of the flow area and the pressure difference between chamber 18 and ambient pressure, where fluid 12 is discharged. This drag force is shared by filament 14 and inner peripheries 30, 40 in proportion to their perimeters. Since the total drag force in each passageway 52, 54 increases in proportion to the area of the corresponding passageway 52, 54, hence to its diameter squared, and the proportion of the respective forces (illustrated by arrows 56, 58, respectively) seen by filament 14 only decreases in proportion to the length of the perimeter of the corresponding passageway 52, 54, hence to its diameter, the force on the filament increases roughly in proportion to the diameter of the corresponding passageway 52, 54. By making the area of second orifice 42 larger that the area of first orifice 32, net drag force 15 will be exerted on filament 14 by fluid 12. Drag force 15, in turn, induces a force into filament 14, opposite drag force 15. In most applications, the acceleration of filament 14 is negligible, and the drag force 15 is balanced by either an induced tension force in the portion of the filament extending outside first orifice 32 or an induced compression force in the portion of the filament extending outside second orifice 42.

Figure 4:
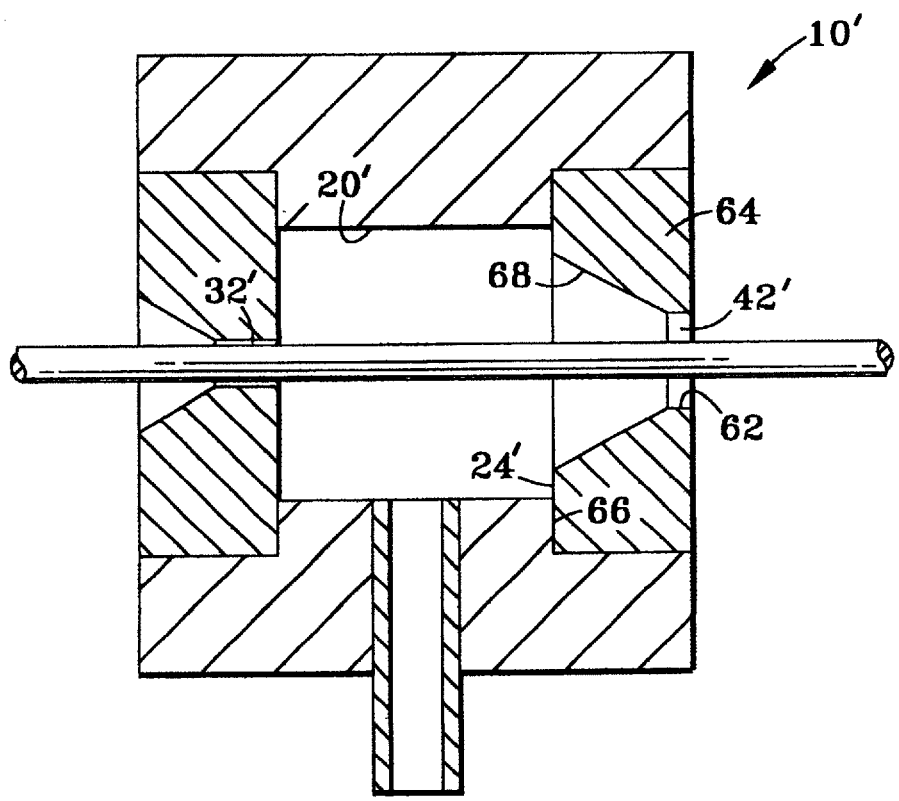
FIG. 4 is an elevational cross-sectional view of an alternative embodiment of force-inducing device according to the present invention.

FIG. 4 shows an alternative embodiment of a force-inducing device 10' according to the present invention. Device 10' is similar to device 10 shown in FIGS. 1–3. However, in lieu of integral second end wall 24 and second orifice 42 defined by tube 38 of the embodiment shown in FIGS. 1 and 3, device 10' includes a second end wall 24' formed separately from sidewall 20' and a second orifice 42' defined by an inner periphery 62 of second end wall 24'. In accordance with the invention, second orifice 42' is characterized by an area larger than the area of first orifice 32', and, thus, device 10' induces tension into filament 14' in the same manner as described above with respect to the embodiment of FIGS. 1–3.

Second end wall 24' comprises a disk 64 seated within a rabbet 66 in sidewall 20'. In a preferred embodiment, for use with a filament having a diameter of 100 microns or less, second end wall 24' is made of diamond and is fastened to sidewall 20' by interference fit. However, depending on the size of device 10' and the materials selected, second end wall 24' may be attached to sidewall 20' by another means such as adhesive bonding, welding, mechanical fasteners, mating threads on the outer periphery of disk 64 and the corresponding surface of rabbet 66 or the like. Second end wall 24' includes a frusto-conical bevel 68 on its interior face that assists in threading filament 14' through device 10'. Optionally, an elongate tube (not shown), such as tube 38 described above with respect to the embodiment of FIGS. 1–3, may be provided.

Figure 5:
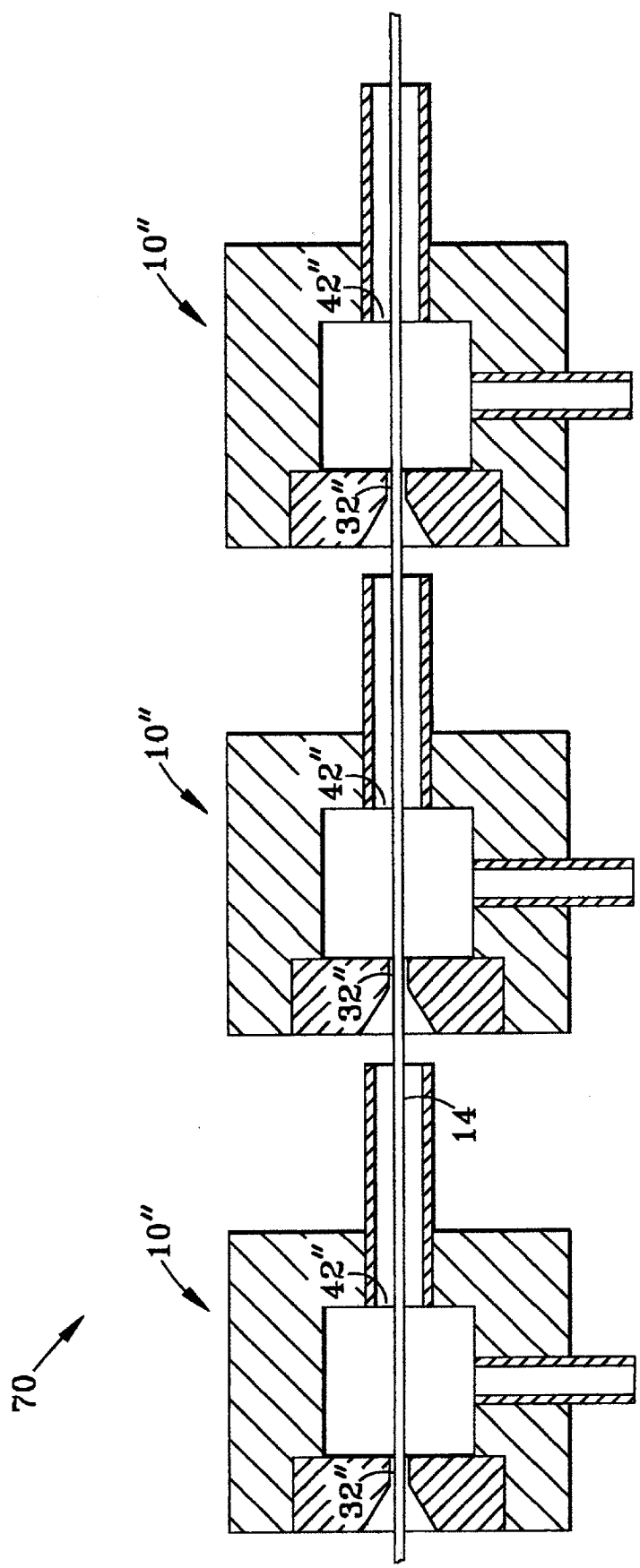
FIG. 5 is an elevational cross-sectional view of a force-inducing system incorporating three force-inducing devices of the present invention.

Referring now to FIG. 5, there is shown a force-inducing system 70 comprising a series of three force-inducing devices 10" similar to those shown in FIGS. 1–3. Arranging devices 10" in this manner allows the force induced into filament 14" by each of devices 10" to be added to one another to create an total force that is the sum of the forces induced by each device 10". Although three devices 10" are shown, any number of devices may be used, depending on the desired design parameters, such as the amount of tension to be induced into the filament, the pressure of the fluid, the sizes of the first and second orifices, the type of filament and the like. The devices need not be identical to one another and need not operate under the same pressure conditions. For example, a system may comprise one device similar to the embodiment of FIGS. 1–3 and two devices similar to the embodiment in FIG. 4. In addition, orifices 32", 42" of the respective devices may have diameters different from one another, and the pressure of the fluid within respective chambers 18" may be different from one another. One skilled in the art will appreciate the various combinations of physical dimensions of the various elements and the various operating parameters that may be used to induce the desired forces into filament 14". Moreover, devices 10" need not be placed adjacent one another, but rather may be interspersed with other pieces of equipment (not shown).

Figure 6:
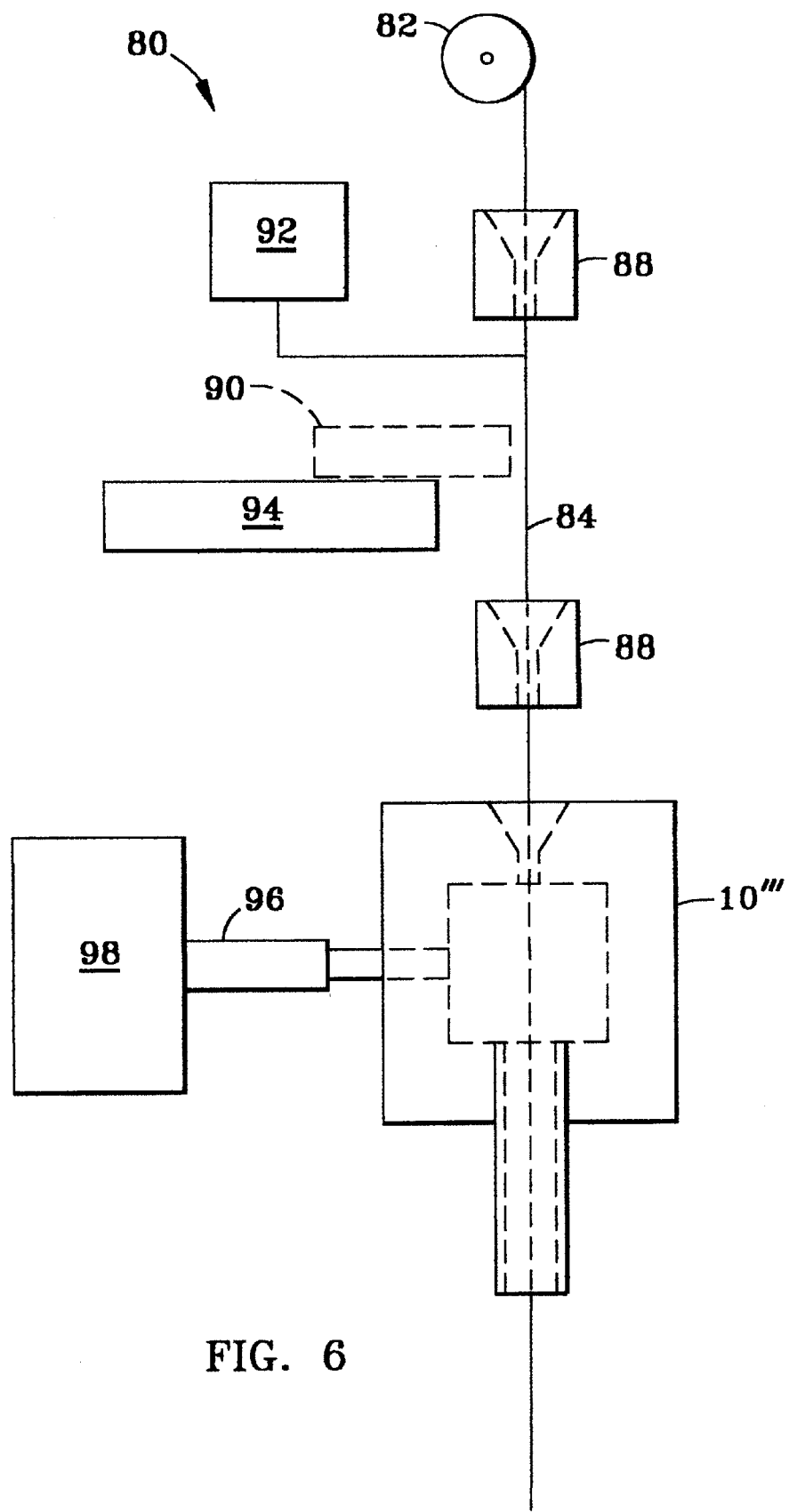
FIG. 6 is a schematic of a traveling-wire EDM machine incorporating a force-inducing device of the present invention.

Referring now to FIG. 6, there is shown a traveling wire EDM system 80 incorporating a force-inducing device 10'" according to present invention. It should be noted that FIG. 6 shows only major components typical of traveling wire EDM systems. One skilled in the art will readily understand the numerous and various configurations of and control schemes for EDM systems incorporating a force-inducing device of the present invention. System 80 includes a payout assembly 82 for feeding a wire 84 to device 10'" during operation. Payout assembly 82 may comprise a spool driven by a motor (not show) controlled by a central control unit (not shown), which may also control the operation of the active components described below.

Wire guides 88 keep wire 84 substantially vertical between guides so that the wire is properly aligned with a workpiece 90. Although wire 84 is shown as being vertical, it may be oriented otherwise, such as horizontal or skewed in any direction with respect to a vertical line. For small diameter wires, such as those having diameters of 100 microns or less, wire guides 88 are typically made of a hard material such as diamond. Wire 84 is in electrical communication with a spark unit 92, which supplies the charge that causes the sparks between the wire and workpiece 90 that disintegrate the desired regions of the workpiece.

System 80 further includes a movable support 94 that supports workpiece 90 and precisely moves the workpiece relative to wire 84 during operation so that the desired material is removed from the workpiece. Workpiece 90 may fixed to movable support 94, e.g., by a clamp or the like, to prevent relative movement therebetween. Movable support 94 is preferably movable in any direction in a horizontal plane, but may also be adjustable in the vertical direction. Force-inducing device 10''' is fluidly coupled via a conduit 96 to a fluid supply system 98 that supplies pressurized fluid to device 10'''.

During operation, wire 84 is paid out from payout assembly 82 and a tensile force is induced into the wire by flowing pressurized fluid (not shown) into device 10''' from fluid supply system 98 as described above with respect to FIGS. 1–3. The pressure of the fluid is selected to induce maximum tension into wire 84 without the wire breaking to minimize any vibration that may be caused when a spark is discharged between the wire and workpiece 90. Movable support 94 moves workpiece 90 relative to wire 84 so that the wire is immediately adjacent to a selected location on the workpiece where material is to be removed. Spark generator 92 is then energized to create a spark between wire 84 and workpiece 90 to disintegrate the desired material. During discharge of the spark, not only is a portion of workpiece 90 disintegrated, but the outer portion of wire 84 is damaged, requiring the wire to be advanced so that an undamaged portion is located adjacent to the workpiece. Accordingly, a new portion of wire 84 is paid out from payout assembly 82 and the damaged portion of the wire is discharged by device 10'''. Workpiece 90 is moved to the next desired location and another spark is generated by spark generator 92 to disintegrate the material at the new location. This sequence of steps is repeated until all of the desired material is removed from workpiece 90.

System 80 may optionally include a take-up assembly (not shown), e.g., a spool, a collection bin or the like, for collecting and storing wire 84 after it is discharged from device 10'''. If a spool-type take-up assembly is used, care must be taken, e.g., by using a control system, to ensure that it does not induce tension into wire 84. Such tension would be added to the tension induced by device 10''' and would likely cause wire 84 to break. In a collection bin type take-up assembly, wire 84 simply collects in a bin placed beneath device 10''' under the force of gravity.

Although the invention has been described and illustrated with respect to the exemplary embodiments thereof, it should be understood by those skilled in the art that the foregoing and various other changed, omissions and additions may be made therein and thereto, without parting from the spirit and scope of the present invention.

What is claimed is:

1. A device for inducing a force into a filament using a fluid, comprising:
    an enclosure said enclosure defining a chamber for receiving the fluid and having an ambient pressure said enclosure including:
        a) a first orifice having an area, said first orifice being in fluid communication with said chamber, said first orifice for receiving the filament and directing the fluid out of said chamber,
        b) a second orifice defining a passageway having a transverse cross-sectional area larger than said area of said first orifice, said second orifice being in fluid communication with said chamber, said second orifice for receiving the filament and directing the fluid out of said chamber,
        c) a sidewall, said sidewall having an inner surface located radially outward from a line extending between said first orifice and said second orifice, and
        d) a fluid inlet in fluid communication with the chamber for providing the fluid to said chamber, said fluid inlet located non-tangentially to said inner surface of said sidewall.

2. A device according to claim 1, wherein said inner surface of said sidewall is cylindrical and said fluid inlet is radial to said inner surface.

3. A device according to claim 1, wherein said chamber has a first end wall and a second end wall opposing said first end wall, said first orifice being located in said first end wall, said second orifice being located in said second end wall, each of said first and second end walls being planar.

4. A device according to claim 3, wherein said second end wall includes a bevel surrounding said second orifice.

5. A device according to claim 1, wherein said passageway has a diameter and a length, said length being at least five times greater than said diameter.

6. A device according to claim 5, wherein said length of said passageway is at least fifty times greater than said diameter of said passageway.

7. A device according to claim 6, wherein said length of said passageway is at least 100 times greater than said diameter of said passageway.

8. A device according to claim 1, wherein said passageway extends within an elongate body, said elongate body being located outside of said chamber.

9. A device according to claim 8, wherein said elongate body is a tube.

10. A device according to claim 9, wherein said tube is secured to said enclosure.

11. A device according to claim 8, wherein said elongate body is an extension of said enclosure.

12. A device according to claim 1, wherein said transverse cross-sectional area of said passageway is at least four times said area of said first orifice.

13. A device according to claim 12, wherein said transverse cross-sectional area of said passageway is at least ten times said area of said first orifice.

14. A device according to claim 1, wherein said cross-sectional area of said first orifice is no greater than 100% larger than said cross-sectional area of said filament.

15. A device according to claim 14, wherein said cross-sectional area of said first orifice is no greater than 25% larger than said cross-sectional areal of said filament.

16. A device according to claim 1, wherein said fluid is pressurized to at least 345 kPa (50 psi).

17. A device according to claim 16, wherein said fluid is pressurized to at least 690 kPa (100 psi).

18. A device according to claim 1, wherein said fluid comprises water.

19. A device according to claim 1, wherein said filament is a wire.

20. A system for applying a force to a filament using a fluid, comprising:
    at least two devices, each device for applying an incremental force to the filament, each device including an enclosure defining a chamber for receiving the filament and the fluid, said enclosure comprising:
        a) a first orifice having an area, said first orifice being in fluid communication with said chamber and directing the fluid out of said chamber;
        b) a second orifice defining a passageway having a transverse cross-sectional area larger than said area of said first orifice, said second orifice being in fluid communication with said chamber, said second orifice for receiving the filament and directing the fluid out of said chamber; and
        c) a fluid inlet in fluid communication with said chamber, said fluid inlet for supplying the fluid to said chamber;
    said devices being located in series with one another such that said incremental forces are applied in the same direction as one another.

21. A system according to claim 20, wherein said chamber has a cylindrical sidewall and said fluid inlet is located non-tangentially to said cylindrical sidewall.

22. A system according to claim 20, wherein said chamber has a first end wall and a second end wall opposing said first end wall, said first orifice being located in said first end wall, said second orifice being located in said second end wall, each of said first and second end walls being planar.

23. A system according to claim 22, wherein said second end wall includes a bevel surrounding said second orifice.

24. A system according to claim 20, wherein said passageway has a diameter and a length, said length being at least five times greater than said diameter.

25. A system according to claim 24, wherein said length of said passageway is at least 50 times greater than said diameter of said passageway.

26. A system according to claim 25, wherein said length of said passageway is at least 100 times greater than said diameter of said passageway.

27. A system according to claim 20, wherein said passageway extends within an elongate body, said elongate body being located outside of said chamber.

28. A system according to claim 27, wherein said elongate body is a tube.

29. A system according to claim 28, wherein said tube is secured to said enclosure.

30. A system according to claim 20, wherein said transverse cross-sectional area of said passageway is at least four times said area of said first orifice.

31. A system according to claim 30, wherein said transverse cross-sectional area of said second orifice is at least ten times said area of said first orifice.

32. A device for applying a force to a filament using a fluid, comprising:
   a) an enclosure, said enclosure defining a chamber for receiving the filament and the fluid, said enclosure including:
      i) a first orifice having an area, said first orifice being in fluid communication with said chamber, said first orifice for receiving the filament and directing the fluid out of said chamber,
      ii) a second orifice in fluid communication with said chamber, said second orifice defining a passageway having a transverse cross-sectional area larger than the cross-sectional area of said first orifice, said passageway for receiving the filament and directing the fluid out of said chamber, and
      iii) a fluid inlet in fluid communication with the chamber, said fluid inlet for supplying the fluid to said chamber; and
   b) an elongate body located outside of said chamber, said passageway extending within said elongate body.

33. A device according to claim 32, wherein said elongate body comprises a tube.

34. A device according to claim 33, wherein said tube is secured to said enclosure.

35. A device according to claim 32, wherein said body is an extension of said enclosure.

36. A device according to claim 32, wherein said passageway has a diameter and a length, said length being at least 50 times greater than said diameter.

37. A device according to claim 35, wherein said length of said passageway is at least 100 times greater than said diameter of said passageway.

38. A system for electric discharge machining a workpiece, comprising:
   a) a wire electrode;
   b) a payout system for paying out said wire electrode;
   c) a movable support, said movable support for supporting the workpiece and moving the workpiece relative to a portion of said wire electrode;
   d) a device, said device for inducing a tensile force into said portion of said wire electrode using a fluid, said device comprising an enclosure defining a chamber for receiving said wire electrode and the fluid, said enclosure comprising:
      i) a first orifice having an area, said first orifice being in fluid communication with said chamber, said first orifice for receiving said wire electrode and directing the fluid out of said chamber,
      ii) a second orifice in fluid communication with said chamber, said second orifice defining a passageway having a transverse cross-sectional area larger than the cross-sectional area of said first orifice, said passageway for receiving said wire electrode and directing the fluid out of said chamber, and
      iii) a fluid inlet in fluid communication with the chamber, said fluid inlet for supplying the fluid to said chamber; and
      iv) a fluid-supply system, said fluid-supply system for supplying the fluid to said device said fluid-supply system being in fluid communication with said fluid inlet of said device.

39. A system according to claim 38, wherein said wire electrode is less than 100 microns in diameter.

40. A system according to claim 39, wherein said wire electrode is less than 50 microns.

41. A system according to claim 38, wherein said device further includes an elongate body located outside said chamber, said passageway extending within said elongate body.

42. A system according to claim 41, wherein said elongate body is a tube attached to said enclosure.

43. A method of inducing a longitudinal force into a filament, comprising the steps of:
   a) providing an enclosure, said enclosure defining a chamber and having first and second orifices in fluid communication with said chamber, said first orifice having an area, said second orifice having an area greater than said area of said first orifice;
   b) threading a filament through said first orifice, said chamber and said second orifice; and
   c) providing a fluid into said chamber such that said fluid is under a pressure relative an ambient pressure surrounding said enclosure and said filament is substantially linear between said first orifice and said second orifice, said fluid being directed through said first orifice out of said chamber and through said second orifice out of said chamber.

44. A method according to claim 43, further including the step of providing a body located outside said chamber, said body defining an elongate passageway in fluid communication with said second orifice.

45. A method according to claim 44, wherein said body is attached to said enclosure.

46. A method according to claim 44, wherein said body is a tube.

47. A method according to claim 43, wherein said fluid comprises water.

48. A method according to claim 43, wherein said pressure of said fluid is at least 345 kPa (50 psi).

49. A method according to claim 47, wherein said pressure of said fluid is at least 690 kPa (100 psi).

* * * * *